United States Patent
Lin

(10) Patent No.: US 8,991,418 B2
(45) Date of Patent: Mar. 31, 2015

(54) PRESSURE RELIEF VALVE

(71) Applicant: Wan-Ju Lin, Taichung (TW)

(72) Inventor: Wan-Ju Lin, Taichung (TW)

( * ) Notice: Subject to any disclaimer, the term of this patent is extended or adjusted under 35 U.S.C. 154(b) by 133 days.

(21) Appl. No.: 13/922,268

(22) Filed: Jun. 20, 2013

(65) Prior Publication Data

US 2014/0373946 A1 Dec. 25, 2014

(51) Int. Cl.
*F16K 17/00* (2006.01)
*F16K 17/168* (2006.01)

(52) U.S. Cl.
CPC .................... *F16K 17/168* (2013.01)
USPC ............. 137/467; 137/893; 137/206

(58) Field of Classification Search
USPC .......................... 137/467, 893, 206
See application file for complete search history.

(56) References Cited

U.S. PATENT DOCUMENTS

| | | | |
|---|---|---|---|
| 2,608,439 A * | 8/1952 | Bates et al. ............... | 137/206 |
| 3,112,884 A * | 12/1963 | Gilmour ................... | 239/318 |
| 3,756,220 A * | 9/1973 | Tehrani et al. ........... | 210/167.11 |
| 3,929,153 A * | 12/1975 | Hasty ...................... | 137/337 |
| 4,323,219 A * | 4/1982 | Carlin ...................... | 251/5 |
| 4,736,891 A * | 4/1988 | Chow et al. .............. | 239/318 |
| 4,951,713 A * | 8/1990 | Jordan et al. ............. | 137/895 |
| 5,141,020 A * | 8/1992 | Sunderhaus et al. ..... | 137/467 |
| 5,622,203 A * | 4/1997 | Givler et al. ............. | 137/337 |
| 5,827,959 A * | 10/1998 | Clanin ..................... | 73/198 |
| 2008/0172944 A1* | 7/2008 | Bartlett .................... | 49/68 |

* cited by examiner

*Primary Examiner* — John Rivell
*Assistant Examiner* — Umashankar Venkatesan

(57) ABSTRACT

A pressure relief valve includes a bonnet threadedly secured to a pressure vessel, a floating device in the pressure vessel, a relief assembly, an actuator secured to the bonnet and communicating with the bonnet, a biasing element put on a stem and biased between a tubular member and a conic member, and a safety valve. The hollow cylinder is slidable in a space defined by the tubular member and a hollow, cylindrical actuating member. The stem is slidably disposed in the tubular member. Pressurized fluid enters a conic opening via an inlet connector, a first channel, a Venturi tube, and a second channel to push the tubular member so as to disengage a latch from a hook to release the pressurized fluid.

1 Claim, 6 Drawing Sheets

PRESSURE RELIEF VALVE

BACKGROUND OF THE INVENTION

1. Field of the Invention

The invention relates to fluid regulators and more particularly to a pressure relief valve with improved characteristics.

2. Description of Related Art

A conventional pressure relief valve is shown in FIGS. 1 and 2 and comprises a cap 1 including an inlet 11, a Venturi tube 12 in one end of the inlet 11, a bypass channel 13 adjacent to the Venturi tube 12, an outlet 14 at the other end of the inlet 11, a bonnet 15 for concealing the outlet 14 and including a central threaded hole 152 and a plurality of vents 151 around the threaded hole 152, and a thumb screw 16 threadedly inserted through the threaded hole 152 to either block the outlet 14 (see FIG. 1) or open the outlet 14 (see FIG. 2). In the later condition, pressurized fluid (e.g., air or gas) may flow out of the outlet 14 and release to the atmosphere via the vents 151 due to the disengagement of the thumb screw 16 from the outlet 14.

However, in a lock-up condition (i.e., the outlet 14 being blocked by the thumb screw 16), internal pressure of a pressure vessel fluidly attached to the pressure relief valve may build up to a value greater than a preset pressure. As a result, the pressure vessel may malfunction, break, or even explode.

Thus, the need for improvement still exists.

SUMMARY OF THE INVENTION

It is therefore one object of the invention to provide a pressure relief valve for a pressure vessel comprising a bonnet threadedly secured to the pressure vessel and comprising first, second, and third channels, and communicating with each other, the first channel being fluidly attached to an inlet connector, the second channel being aligned with the first channel, the third channel having one end communicating with one end of the second channel proximate to the first channel and an other end extending into the pressure vessel, a conic opening extending out of an orifice of the second channel distal the first channel, a Venturi tube disposed at a joining portion of the first channel and the second channel proximate to one end of the third channel, and a handle; a floating device comprising a float, a hollow guide member secured to the bonnet, and a tapered plug secured to the float and disposed through the guide member into the third channel; a relief assembly comprising a stem and a conic member at one end of the stem; an actuator comprising a mounting member secured to the bonnet with the conic opening disposed therein, a hollow cylinder extending outward from the mounting member and communicating with the conic opening, the hollow cylinder including two opposite projections on an outer surface, a spring biased lever pivotably secured to the mounting member and including a hook, a hollow, cylindrical actuating member including two opposite slots on a perimetric surface for receipt of the projections so as to join the mounting member and the hollow, cylindrical actuating member, a plurality of vent holes on an end surface distal the bonnet, a latch on a top of an other end facing the bonnet, the latch being releasably secured to the hook, and a tubular member concentrically extending inward from the vent holes, and a biasing member put on the tubular member and biased between the vent holes and the hollow cylinder; a biasing element put on the stem and biased between the tubular member and the conic member; and a safety valve disposed on a top of the bonnet and in communication with the pressure vessel; wherein the hollow cylinder is slidable in a space defined by the tubular member and the hollow, cylindrical actuating member; wherein the stem is slidably, partially disposed in the tubular member; wherein the projections are slidable in the slots; wherein pressurized fluid enters the conic opening via the inlet connector, the first channel, the Venturi tube, and the second channel to push the tubular member so as to disengage the latch from the hook to release the pressurized fluid via the vent holes after passing the hollow cylinder, the hollow, cylindrical actuating member, and the tubular member; and the pressurized fluid in the pressure vessel flows to the second channel via the hollow guide member and the third channel, thereby creating a negative pressure in the pressure vessel; and wherein after the disengagement of the latch from the hook, the latch and the hook are fastened together by pushing the actuating member toward the bonnet, thereby blocking the conic opening to divert the pressurized fluid into the pressure vessel via the third channel and the guide member.

The above and other objects, features and advantages of the invention will become apparent from the following detailed description taken with the accompanying drawings.

DETAILED DESCRIPTION OF THE INVENTION

Figure 1:
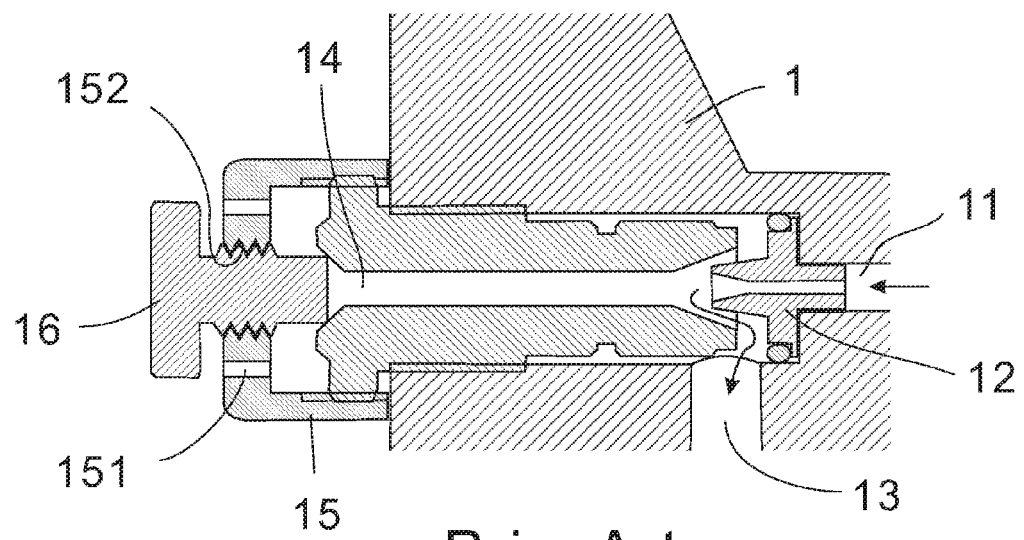
FIG. 1 is a sectional view of a conventional pressure relief valve fluidly attached to a pressure vessel, the pressure relief valve being closed.
Figure 2:
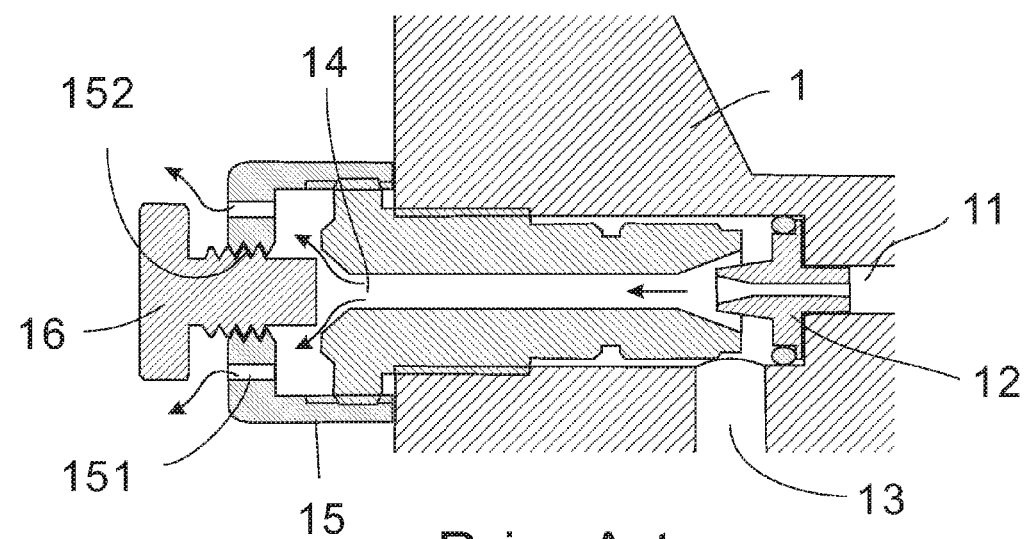
FIG. 2 is view similar to FIG. 1, the pressure relief valve being open.
Figure 3:
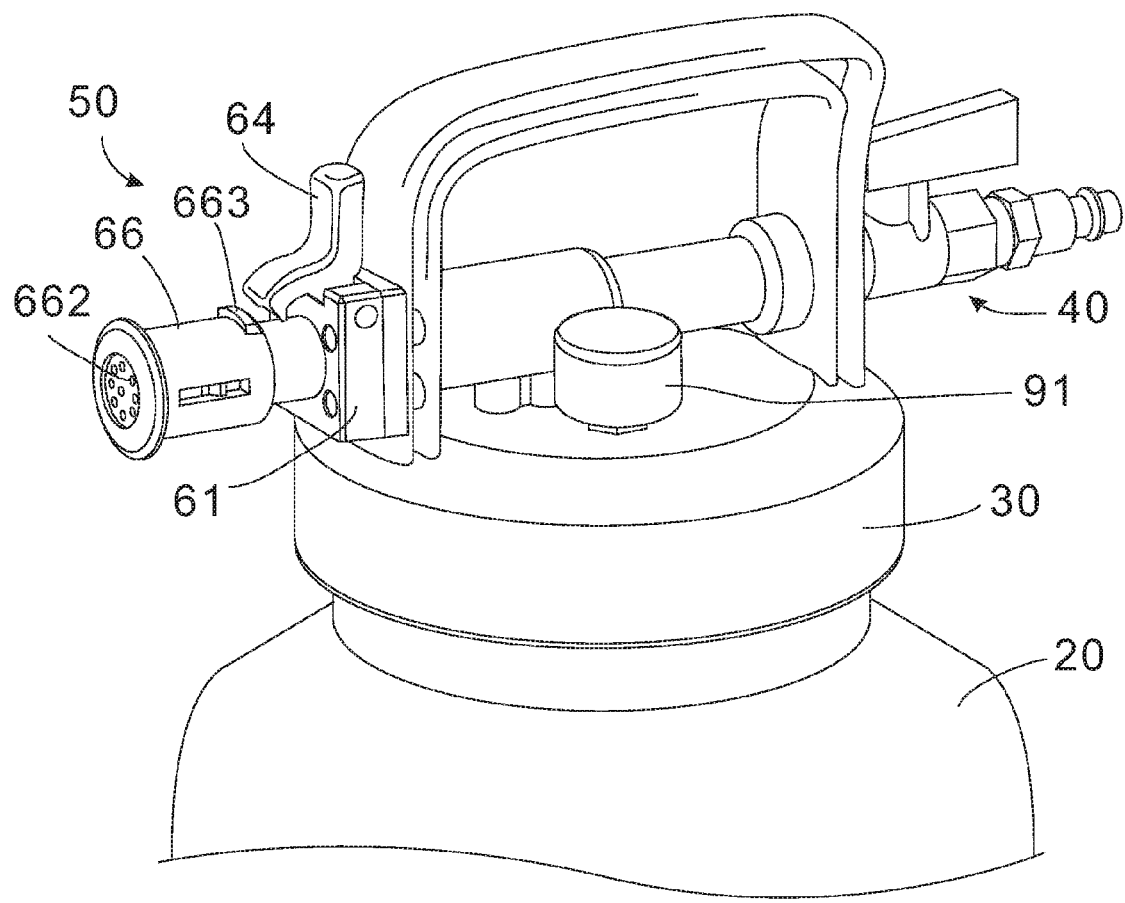
FIG. 3 is a perspective view of a pressure relief valve according to the invention, the pressure relief valve mounted on top of a pressure vessel.
Figure 4:
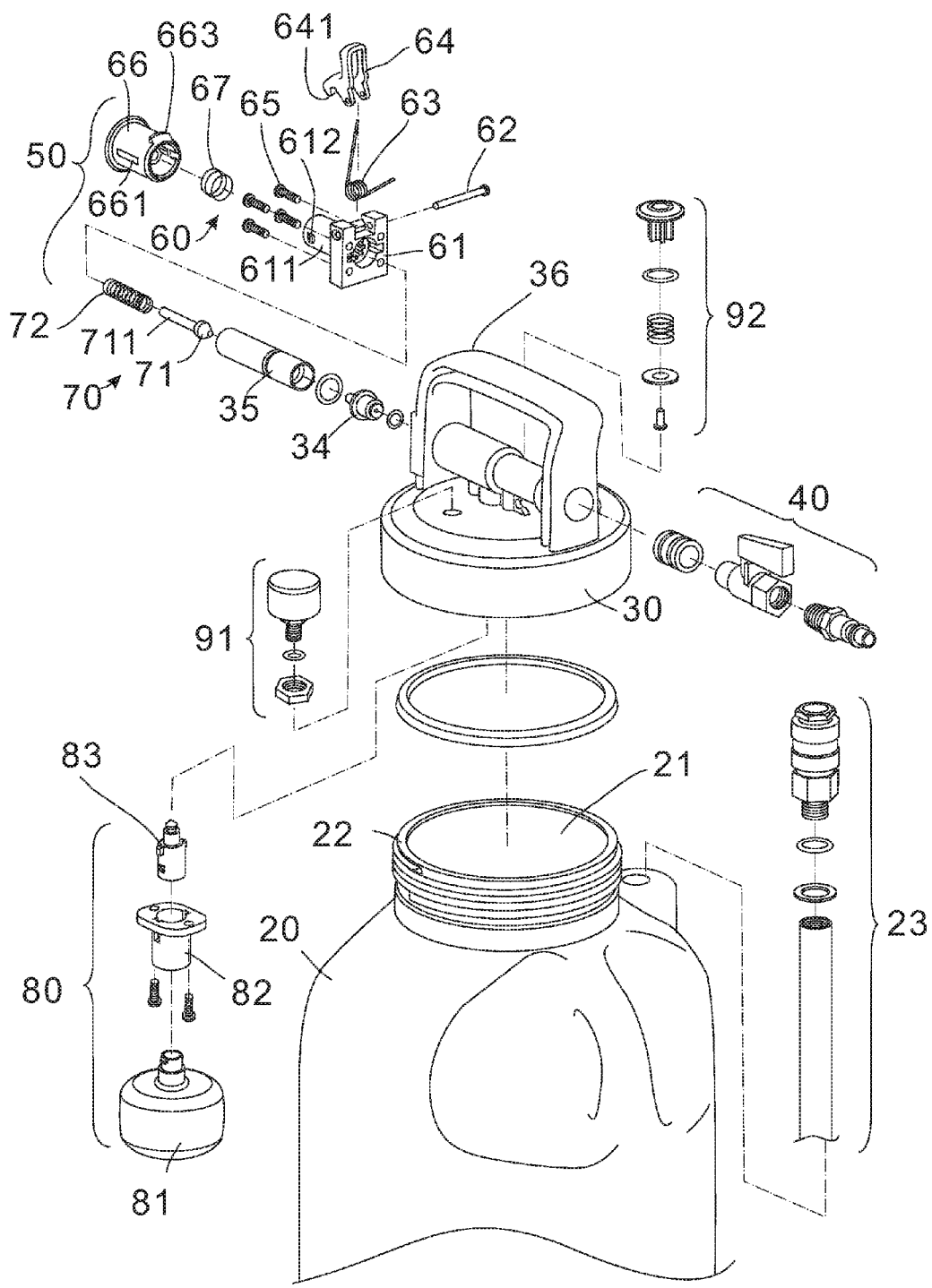
FIG. 4 is an exploded view of FIG. 3.
Figure 5:
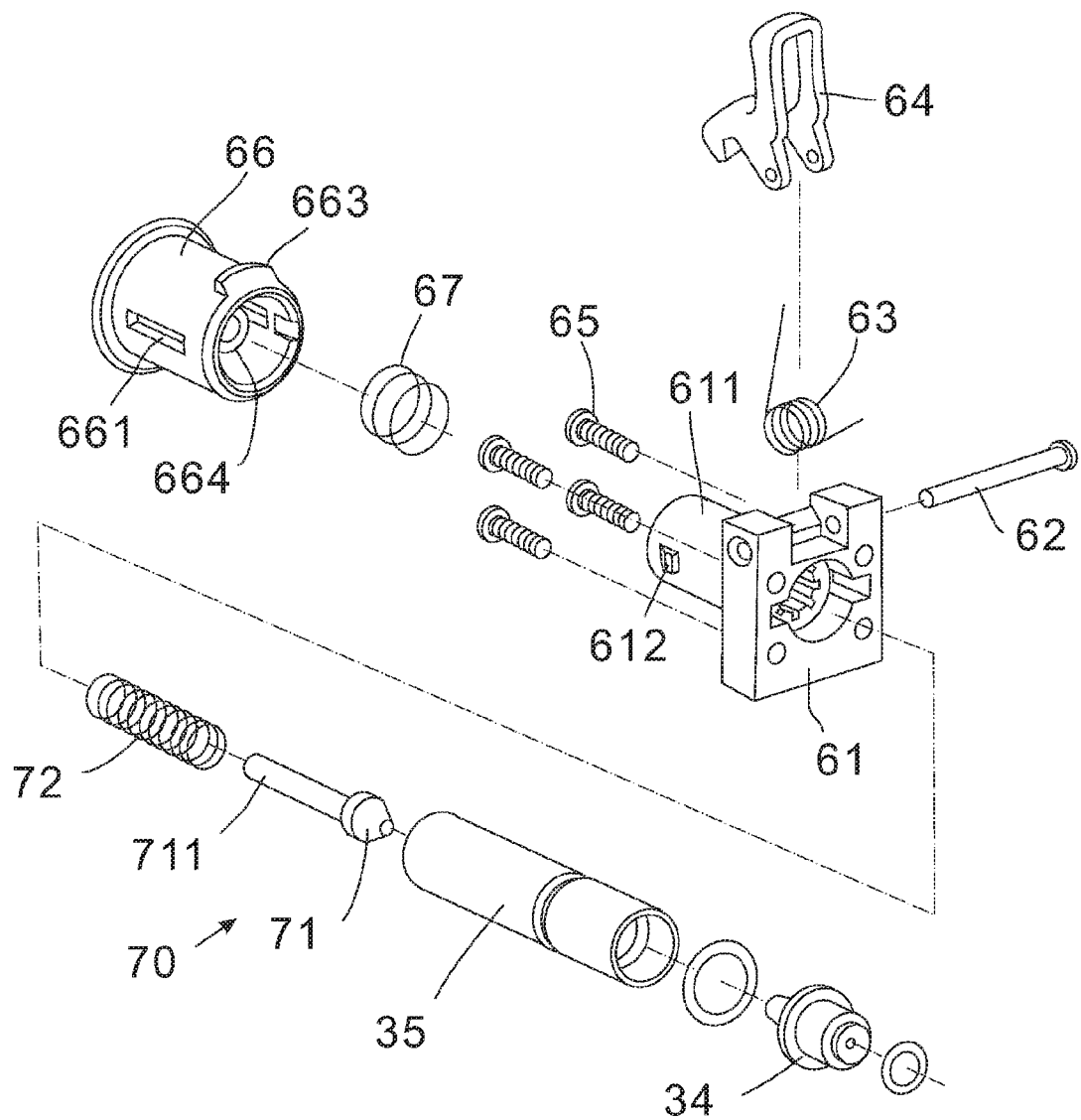
FIG. 5 is an enlarged view of the components shown in top left corner of FIG. 4.

Referring to FIGS. 3 to 7, a pressure relief valve in accordance with the invention is fluidly attached to a top of a pressure vessel 20. The pressure vessel 20 includes an internal space 21 for containing pressurized fluid (e.g., air, gas, or liquid), an externally threaded opening 22, and a fluid input and output device 23 for filling pressurized fluid into the internal space 21 for storage or releasing pressurized fluid to the atmosphere.

The pressure relief valve comprises the following components as discussed in detail below.

A bonnet 30 is threadedly secured to the externally threaded opening 22 and comprises first, second, and third channels 31, 32, and 33 communicating with each other and shaped as a T. The first channel 31 is fluidly attached to an inlet connector 40. The second channel 32 is aligned with the first channel 31. Within the second channel 32, a tunnel 35 is provided for restricting diameter of the cylindrical second channel 32. The tunnel 35 has a conic opening 351 at an orifice 321 of the second channel 32 distal the first channel 31. The third channel 33 has one end communicating with one end of the second channel 32 proximate to the first channel 31 and the other end extending to the externally threaded opening 22. A Venturi tube 34 is provided at a joining portion of the first channel 31 and the second channel 32 proximate to one end of the third channel 33.

A floating device 80 comprises a lower float 81, a hollow guide member 82 threadedly secured to the bonnet 30, and a tapered plug 83 secured to the float 81 and disposed through the guide member 82 into the third channel 33.

A control device 50 is disposed at the other end of the tunnel 35 opposite to the inlet connector 40 and comprises a manual actuator 60 and a relief assembly 70 including a stem 711, a conic member 71 at one end of the stem 711 and adapted to block or open the conic opening 351, and a helical spring 72 put on the stem 711.

The manual actuator 60 comprises a mounting member 61, a hollow cylinder 611 extending outward from the mounting member 61, two opposite projections 612 on an outer surface of the cylinder 611, a pivotal lever 64 having a hook 641, a torsion spring 63 disposed in a top of the mounting member 61 and having one end urging against an inner surface of the lever 64 and the other end urging against a handle 36 of the bonnet 30, a pin 62 inserted through the mounting member 61 and the torsion spring 63 to anchoring both the lever 64 and the torsion spring 63, a plurality of screws 65 driven through the mounting member 61 into the bonnet 30 so that the cylinder 611 may communicate with the conic opening 351, a hollow, cylindrical actuating member 66 including two opposite slots 661 on a perimetric surface for receipt of the projections 612, joining the actuating member 66 and the mounting member 61, and allowing the projections 612 to slide in the slots 661, a latch 663 on top of an opening facing the bonnet 30, a plurality of vent holes 662 on an end surface distal the bonnet 30, and a tubular member 664 concentrically extending inward from the end surface with the cylinder 611 partially disposed therein, and a helical spring 67 put on the tubular member 664 and biased between the end surface and the cylinder 611. Further, the helical spring 72 is biased between the tubular member 664 and the conic member 71. The stem 711 is adapted to slide in the tubular member 664. Furthermore, a pressure gauge 91 is provided on top of the bonnet 30 and in communication with the space 21. Furthermore, a safety valve 92 is provided on top of the bonnet 30 and in communication with the space 21.

Figure 6:
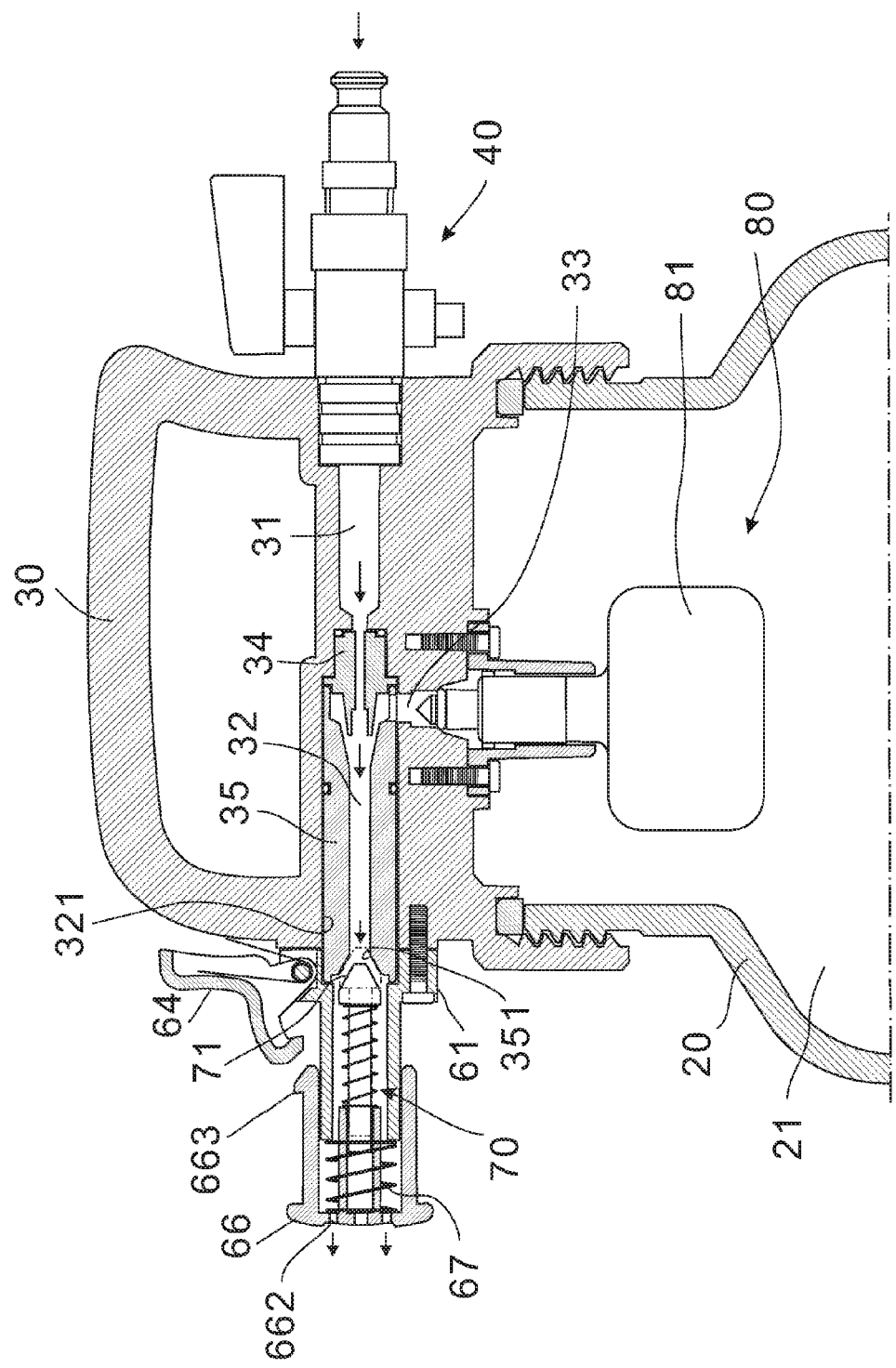
FIG. 6 is a sectional view of FIG. 3 where the pressure relief valve is open for releasing fluid to the atmosphere.

As shown in FIG. 6, pressurized fluid (e.g., air) may enter the bonnet 30 via the inlet connector 40 and the first channel 31. The pressurized fluid further push the spring biased conic member 71 away from the conic opening 351 with the spring 72 being compressed. The pressurized fluid may further push the tubular member 664 outward to disengage the latch 663 from the hook 641 with the spring 67 being compressed. As such, pressurized fluid is released to the atmosphere via the vent holes 662. At the same time, the pressurized fluid in the pressure vessel 20 flows to the second channel 32 via the guide member 82 and the third channel 33. As a result, internal pressure of the pressure vessel 20 is decreased to a value no more than a predetermined set pressure. A negative pressure is created in the pressure vessel 20 and in turn it sucks pressurized fluid from the fluid input and output device 23 to the pressure vessel 20.

Figure 7:
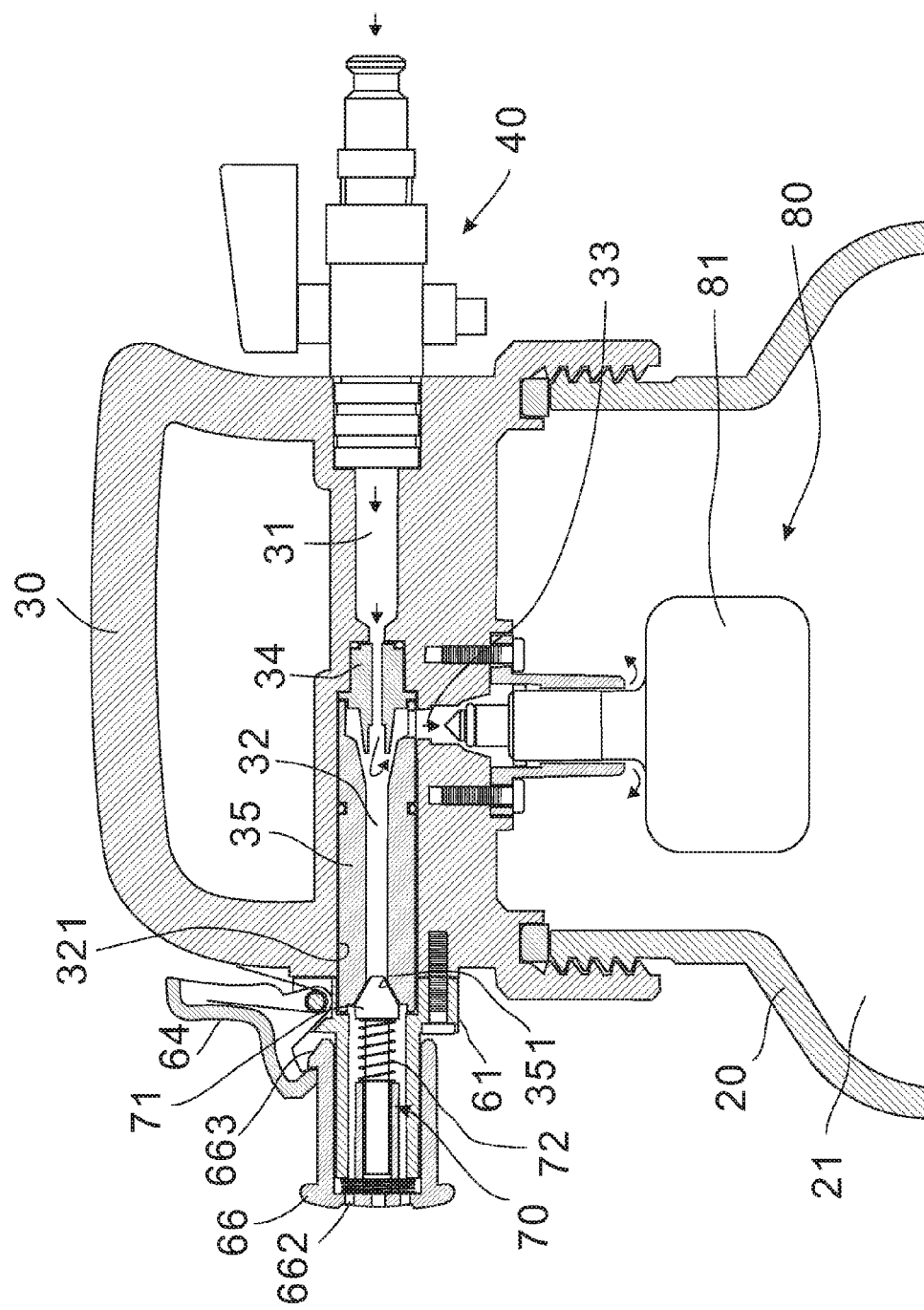
FIG. 7 is a view similar to FIG. 6 where the pressure relief valve is closed to draw fluid into the pressure vessel for storage.

An individual may push the actuating member 66 from the position of FIG. 6 to that of FIG. 7 with the latch 663 and the hook 641 being releasably fastened. The flow path between the conic member 71 and the conic opening 351 is thus blocked. Pressurized fluid leaving the Venturi tube 34 is forced to divert into the pressure vessel 20 via the third channel 33 and the guide member 82. Thereafter, the pressurized fluid may flow through the fluid input and output device 23 for output.

Additionally, any abnormal pressure buildup in the pressure vessel 20 can be mitigated through the safety valve 92.

While the invention has been described in terms of preferred embodiments, those skilled in the art will recognize that the invention can be practiced with modifications within the spirit and scope of the appended claims.

What is claimed is:

1. A pressure relief valve for a pressure vessel comprising:
   a relief assembly comprising a stem and a conic member at one end of the stem;
   a bonnet threadedly secured to the pressure vessel and comprising first, second, and third channels, and communicating with each other, the first channel being fluidly attached to an inlet connector, the second channel being aligned with the first channel, the third channel having one end communicating with one end of the second channel proximate to the first channel and an other end extending into the pressure vessel, a conic opening extending out of an orifice of the second channel distal the first channel, a Venturi tube disposed at a joining portion of the first channel and the second channel proximate to one end of the third channel, and a handle;
   a floating device comprising a float, a hollow guide member secured to the bonnet, and a tapered plug secured to the float and disposed through the guide member into the third channel;
   an actuator comprising a mounting member secured to the bonnet with the conic opening disposed therein, a hollow cylinder extending outward from the mounting member and communicating with the conic opening, the hollow cylinder including two opposite projections on an outer surface, a spring biased lever pivotably secured to the mounting member and including a hook, a hollow, cylindrical actuating member including two opposite slots on a perimetric surface for receipt of the projections so as to join the mounting member and the hollow, cylindrical actuating member, a plurality of vent holes on an end surface distal the bonnet, a latch on a top of an other end facing the bonnet, the latch being releasably secured to the hook, and a tubular member concentrically extending inward from the vent holes, and a biasing member put on the tubular member and biased between the vent holes and the hollow cylinder;
   a biasing element put on the stem and biased between the tubular member and the conic member; and
   a safety valve disposed on a top of the bonnet and in communication with the pressure vessel;
   wherein the hollow cylinder is slidable in a space defined by the tubular member and the hollow, cylindrical actuating member;
   wherein the stem is slidably, partially disposed in the tubular member;
   wherein the projections are slidable in the slots;
   wherein pressurized fluid enters the conic opening via the inlet connector, the first channel, the Venturi tube, and the second channel to push the tubular member so as to disengage the latch from the hook to release the pressurized fluid via the vent holes after passing the hollow cylinder, the hollow, cylindrical actuating member, and the tubular member; and the pressurized fluid in the pressure vessel flows to the second channel via the hollow guide member and the third channel, thereby creating a negative pressure in the pressure vessel; and
   wherein after the disengagement of the latch from the hook, the latch and the hook are fastened together by pushing the actuating member toward the bonnet, thereby blocking the conic opening to divert the pressurized fluid into the pressure vessel via the third channel and the guide member.

\* \* \* \* \*